United States Patent [19]

Karafiath et al.

[11] Patent Number: 5,280,761
[45] Date of Patent: Jan. 25, 1994

[54] COMBINED BULBOUS BOW AND SONAR DOME FOR A VESSEL

[75] Inventors: Gabor Karafiath, Silver Spring; Dominic S. Cusanelli, Frederick, both of Md.

[73] Assignee: The United States of America as represented by the Secretary of the Navy, Washington, D.C.

[21] Appl. No.: 930,940

[22] Filed: Aug. 17, 1992

[51] Int. Cl.⁵ .............................................. B63B 1/06
[52] U.S. Cl. .................................. 114/56; 114/67 R; 114/288
[58] Field of Search .................. 114/56, 67 R, 61, 1, 114/2, 3, 312, 313, 21 A; 440/68; 367/1, 2, 134, 910; 181/110, 118; 340/850, 851

[56] References Cited

U.S. PATENT DOCUMENTS

| | | | |
|---|---|---|---|
| Re. 26,997 | 12/1970 | Eckert | 114/56 |
| 2,918,029 | 12/1959 | Legat | 114/313 |
| 3,250,238 | 5/1966 | Reder | 114/313 |
| 3,302,603 | 2/1967 | Eckert | 114/56 |
| 3,455,262 | 7/1969 | Weicker | 114/56 |
| 3,946,687 | 3/1976 | Taylor et al. | 114/56 |
| 4,003,325 | 1/1977 | Allen | 114/56 |
| 4,359,010 | 11/1982 | Inui | 114/57 |
| 4,550,673 | 11/1985 | Ingvason | 114/56 |
| 4,706,596 | 11/1987 | Charvin | 114/312 |
| 4,843,989 | 7/1989 | Langenberg | 114/56 |
| 5,008,863 | 4/1991 | Archibald | 114/280 |
| 5,090,352 | 2/1992 | Stanford | 114/67 |

OTHER PUBLICATIONS

Kracht, Alfred M. "Design of Bulbous Bows," The Society of Naval Architects and Marine Engineers Transactions, vol. 86 (1978), pp. 197-217.

Primary Examiner—Robert J. Oberleitner
Assistant Examiner—Clifford T. Bartz
Attorney, Agent, or Firm—Gary G. Borda

[57] ABSTRACT

To reduce the total ship resistance and to improve a propeller efficiency and cavitation performance due to the reduced thrust loading on the propeller for ships or vessels having a sonar dome or an equivalently shaped designs located below the baseline of the hull, a teardrop-shaped bulbous bow is attached to the ship stem bow between the forward perpendicular of the bow and 12.7 ft forward of the forward perpendicular of the vessel, inclusive, and between the ship design waterline and the baseline. The bulbous bow is separate and discrete, and spaced from the sonar dome and has a shaped of a teardrop. The teardrop shaped bulbous bow is mounted to the ship stem bow with the round end portion pointing in the forward direction and the pointed end portion pointing in the aft direction.

17 Claims, 8 Drawing Sheets

COMBINED BULBOUS BOW AND SONAR DOME FOR A VESSEL

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

This invention relates to a hullform configuration to improve efficiency and power of vessels or the like. In particular, the invention relates to improved performance for a Naval destroyer with a sonar dome positioned below the baseline of the hull.

2. Description of the Prior Art

Many different types of bulbous bow configuration have been contemplated in the past in attempting to minimize drag and wave resistances caused by a vessel moving through water, to increase speed and to save fuel. Weicker U.S. Pat. No. 3,455,262; Taylor et al. U.S. Pat. No. 3,946,687; Allen U.S. Pat. No. 4,003,325; Inui U.S. Pat. No. 4,359,010; Ingvason U.S. Pat. No. 4,550,673; Langenberg U.S. Pat. No. 4,843,989; Stanford U.S. Pat. No. 5,090,352; and Eckert U.S. Pat. No. 3,302,603, and Re 26,997, for instance, disclose different types of bulbous bow configuration for commercial vessels. In general, these bulbous bows extend in front of the bow, between the vessel baseline (BL) and the vessel waterline (DWL) and continue toward the hull thereof.

A Naval ship, such a high speed Naval destroyer DDG-51 Flight I with an AN/SQS-53C sonar dome (hereafter the Naval destroyer) of the U.S. Navy, in contrast, has a relatively large teardrop-shaped sonar dome at the bow for housing a sonar equipment. The sonar dome is situated below the ship baseline to minimize any interfering noise caused by flow of water. Generally, the sonar dome is located in free stream flow ahead of any noise sources, such as the bow wave breaking, and below the Naval destroyer baseline. It has been found that the sonar dome of that type which are situated below the ship baseline generally increases the drag resistance of the ship at low and cruise speeds, while reducing the drag resistance by 1-2% at the maximum speed.

The naval destroyer has a 466 ft LBP, a 60 ft beam, 20.688 ft draft, and a displacement of 8500 tons. The principle scaled body plan (scale factor of 20.2609) for the Naval destroyer, also known as DTMB Model 5422, is represented in FIG. 1, with the forward end of the sonar dome (SD) located at 4.5 ft ship scale forward of the forward perpendicular. FIG. 1 shows a conventional ship body plan. The reference lines DWL and BL represents the design waterline and the baseline, respectively. The length of the ship from the forward perpendicular to the transom is divided into twenty equally spaced stations. The distance between each station is 23.3 ft ship scale. Each of the numbers 0, ½, 1, 2, 4, 6, 8, 10, 11, 13, 14, 15, 16, 17, 18, 19 and 20 is a cross sectional configuration of the hull at that station.

The sonar dome typically has a much smaller effect on the wavemaking resistance of the ship than a bulbous bow which is located close to the waterline and has a much greater impact on the ship wavemaking resistance.

Commercial vessels, including some Naval ships without the sonar domes, on the other hand, may utilize bulbous bows of the type described in the above patents, but not in combination with a sonar dome. Prior to the present invention, a combination of a near surface bulbous bow and a below baseline sonar dome has not been contemplated because the sonar dome and the bulbous bow are in relatively close proximity to each other and thus were theorized to have been mutually exclusive. In other words, the sonar dome would have substituted for the bulbous bow and vice-versa, but not in combination.

SUMMARY OF THE INVENTION

The object of the present invention is to reduce the total ship resistance and, thus, to improve propeller efficiency and cavitation performance due to the reduced thrust loading on the propeller for ships or vessels having a sonar dome or an equivalently shaped member located below the baseline of the hull. More specifically, the object of the present invention is to increase the cavitation inception speed of a ship, in particular for the Naval destroyer operating speeds of 10 to 32 knots. More preferably, it is the object of the present invention to decrease the total ship resistance at operating speeds of 14 to 31 knots.

The present inventors have discovered that the above object can be achieved by adding a teardrop-shaped bulbous bow at the stem bow between the vessel waterline (DWL) and the vessel baseline (BL) in a spaced relationship with the sonar dome or equivalently shaped member. The forward end of the bulbous bow extends forward to a point between the forward perpendicular of the bow and 12.7 ft forward of the forward perpendicular. The uppermost extending point of the bulbous bow is located about 1 ft below the design waterline.

The present invention is contemplated for all ships and vessels that have a sonar dome or an equivalently shaped member located below the baseline of the hull, but particularly contemplated for the Naval destroyer. The present invention provides an apparatus and a method for reducing the total resistance through the water of a ship or vessel having a sonar dome or an equivalently shaped member located below the vessel baseline and for thus improving the propeller efficiency and propeller cavitation performance of the advancing ship or vessel. An apparatus and a method are provided whereby a bulbous bow comprising a smooth, tapered body of revolution having a rounded forward end located at or forward of the vessel forward perpendicular and a tapered aft end located aft of the vessel forward perpendicular is symmetrically attached to the forward section of the ship or vessel between the vessel waterline and the vessel baseline in a spaced relationship with the sonar dome or equivalently shaped member. The bulbous bow and sonar dome are located in a vertical alignment and share a common longitudinal centerline. In particular, the present invention uses a teardrop-shaped bulbous bow with the round end portion pointing in the forward direction of the associated ship and the pointed end portion pointing in the aft or stern direction of the associated ship.

Fuel savings and increased top end speeds are realized due to the reduction of total ship resistance by adding a bulbous bow of the present invention. The greatest potential for reduction of both total ship resistance and the annual effective time averaged power are achieved when the forward end of the present bulbous bow is located at 12.7 ft ahead of the forward perpendicular. The present bulbous bow and sonar dome combination reduced the annual time-averaged effective power over the Naval destroyer (DDG-51 Flight I with an AN/SQS-53C sonar dome) speed-time profile by about 4 percent, and the effective power at 20 was decreased about by 6 percent when the forward end of the bulbous bow is located at 12.7 ft forward of the forward perpendicular and about by 2 percent when located at the forward perpendicular.

DESCRIPTION OF THE PREFERRED EMBODIMENT

The reduction in resistance by the addition of a bulbous bow to a hullform is derived primarily by the lowering of wavemaking resistance through attenuation of the bow wave system of the ship. Moreover, it has been theorized that the bulbous bow also reduces viscous resistance by smoothing the flow around the forebody as described in Kracht, A. M., "Design of Bulbous Bows", Society of Naval Architects and Marine Engineers (SNAME) Transactions, Volume 86 (1978).

A bulbous bow can have various shapes and sizes as shown, for instance in the above-identified patents. However, the preferred embodiments set forth herein have been contemplated with a bulbous bow having a smooth, tapered body of revolution consisting of a rounded forwardly extending nose smoothly tapered to an aft point, similar to a teardrop geometry. As shown in FIGS. 2, 2A, 2B, and 3, the preferred embodiment of the bulbous bow can be envisioned as having two contiguous but distinct pieces, a forwardly extending piece and a rearwardly extending piece. The forwardly extending piece has a rounded nose at or forward of the forward perpendicular (i.e., a body of revolution having a semi-circular cross-sectional shape in longitudinal direction and, thus, a semi-spherical shape) and a tapered portion between the rounded nose and the stem bow (the stem bow is shown as section I in FIGS. 2 and 3). The rearwardly extending piece continues in a smooth taper aft of the stem bow ending in a point. The rearwardly extending piece includes a cut-out or hollow section having the shape of the bow section over which it is placed to facilitate its placement around the bow section of the vessel. The two pieces are joined together at the stem bow of the ship at the prescribed locations.

The embodiment expressly shown and described herein will be explained by way of Example described below.

THE EXAMPLE

Figure 1:
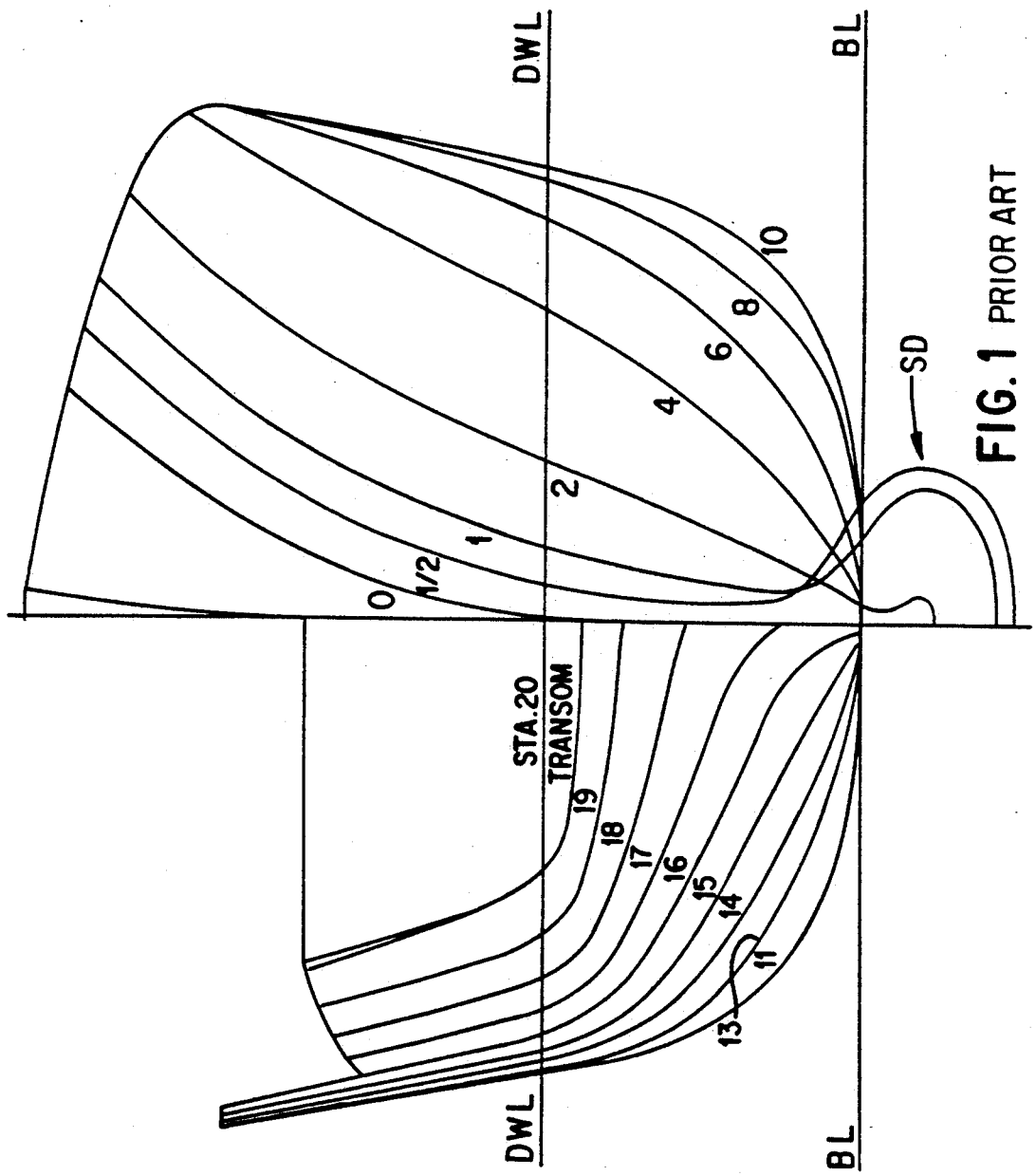
FIG. 1 shows a body plan view of a scaled representation model of a Prior Art body plan of the Naval destroyer model DDG-51 Flight I with an AN/SQS-53C sonar dome.
Figure 2:
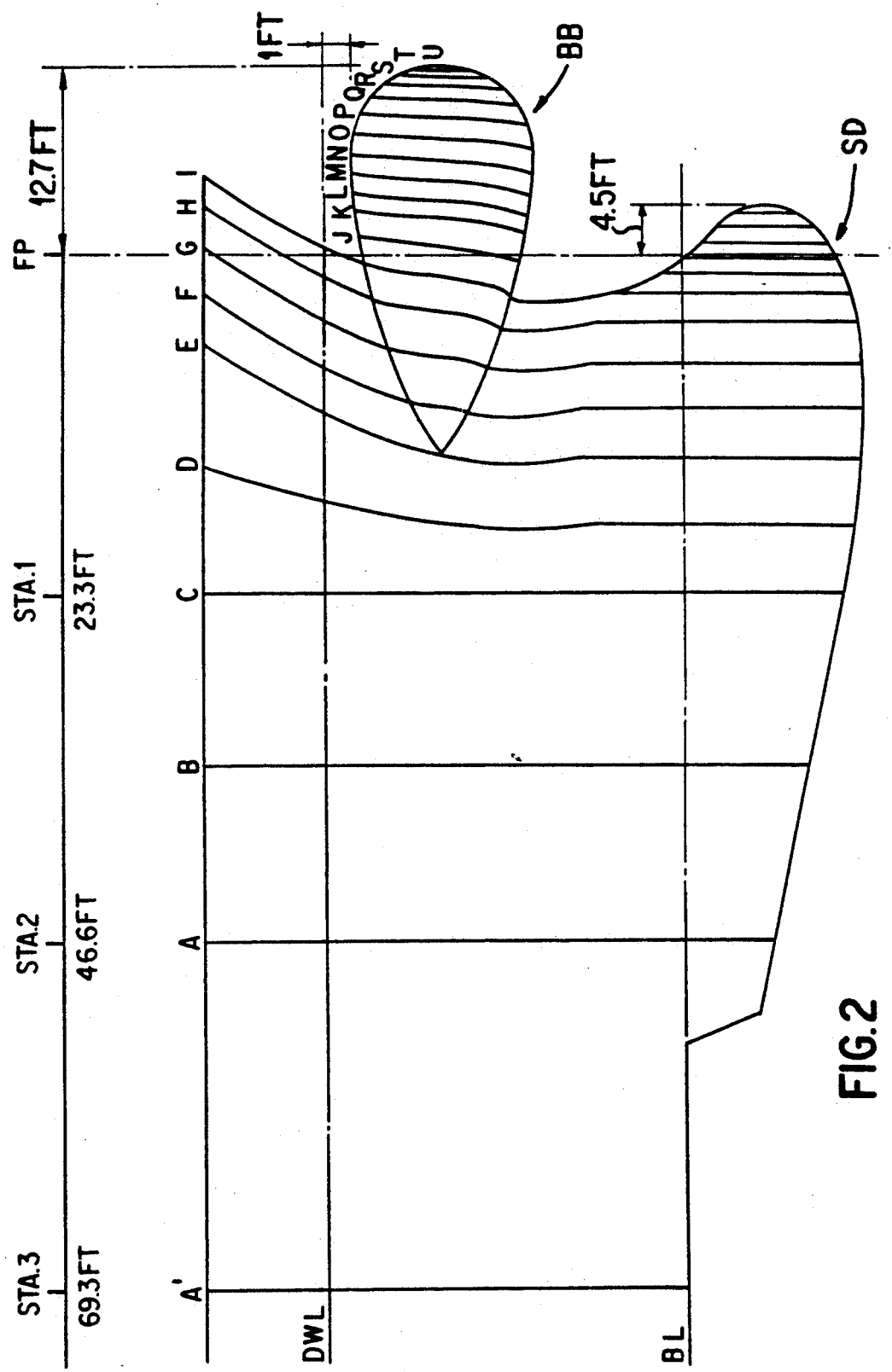
FIG. 2 is a profile view of the scaled model shown in FIG. 1 with the teardrop shaped bulbous bow of the present invention mounted at 12.7 ft forward of the forward perpendicular.
Figure 3:
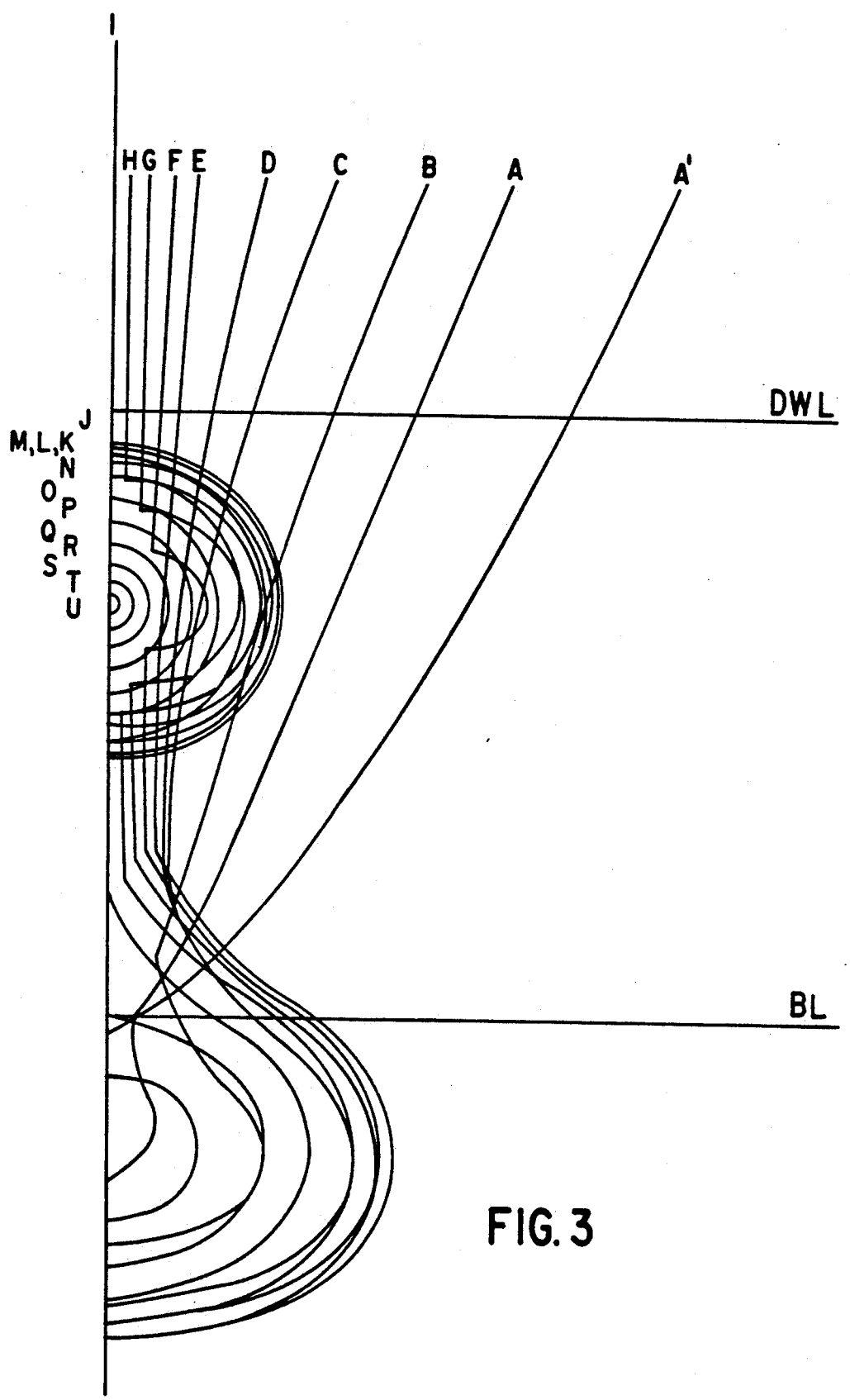
FIG. 3 is a body plan view of the scaled model shown in FIG. 2.

FIG. 2 shows a schematic portion of the scale model of DDG-51 with an AN/SQS-53C sonar dome (SD) in combination with the teardrop shaped bulbous bow (BB) having a rounded forward end located at 12.7 ft ship scale forward of the forward perpendicular. The scale model (a scale factor of 20.2609) is known as DTMB MODEL 5422 (hereafter the "Model") constructed of pine which is representative of the Naval destroyer (DDG-51 Flight I with an AN/SQS-53C sonar dome (SD)). All length, area and volume measurements referred to herein are ship scale measurements. FIG. 2 shows the three forward most stations of the bow section, each spaced apart by 23.3 ft. The sections A' and A-U corresponds to the identical sections shown in FIG. 3. FIG. 3 shows the body plan view of the Model with the teardrop shaped bulbous bow having a rounded forward end located at 12.7 ft ship scale forward of the FP similar to FIG. 1, but only partially showing the Model representative of the Naval destroyer.

The Model was fitted with bilge keels, skeg, propeller shaft tubes, propeller shaft support struts ("V" struts), strut barrels, twin rudders with rudder stools, and the small transom stern wedge (all not shown) representative of the same which is adapted for use on the Naval destroyer. The small transom stern wedge has a longitudinal chord length of 3.17 ft and a nominal centerline wedge angle of 13 degrees. The propeller shaft tubes, propeller shaft support struts, and strut barrels fitted on the Model represent an appendage sized for a 17 ft diameter propeller.

Figure 2A:
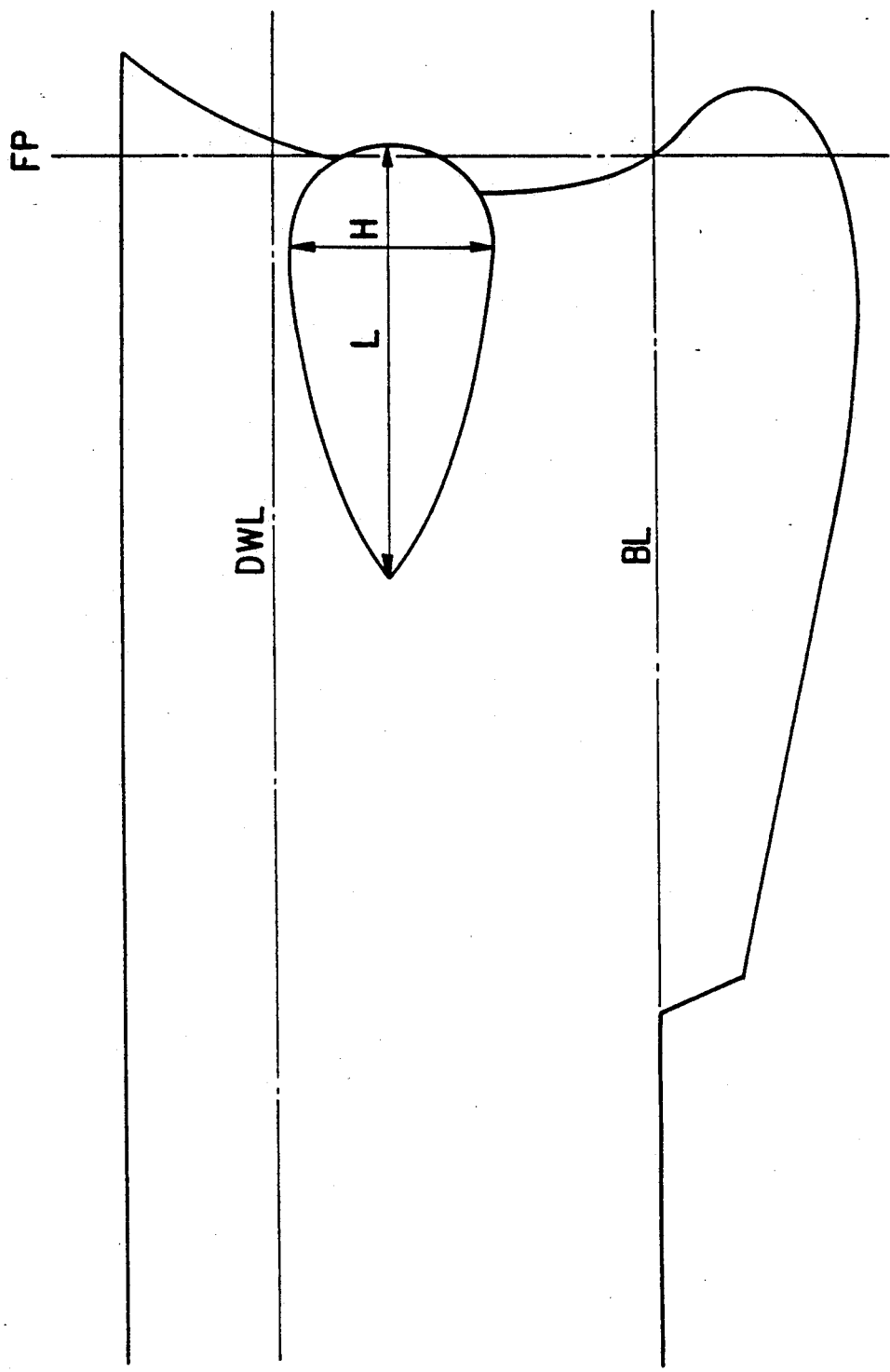
FIG. 2A is a side view of the bow portion similar to FIG. 2, with the bulbous bow positioned at the forward perpendicular.
Figure 2B:
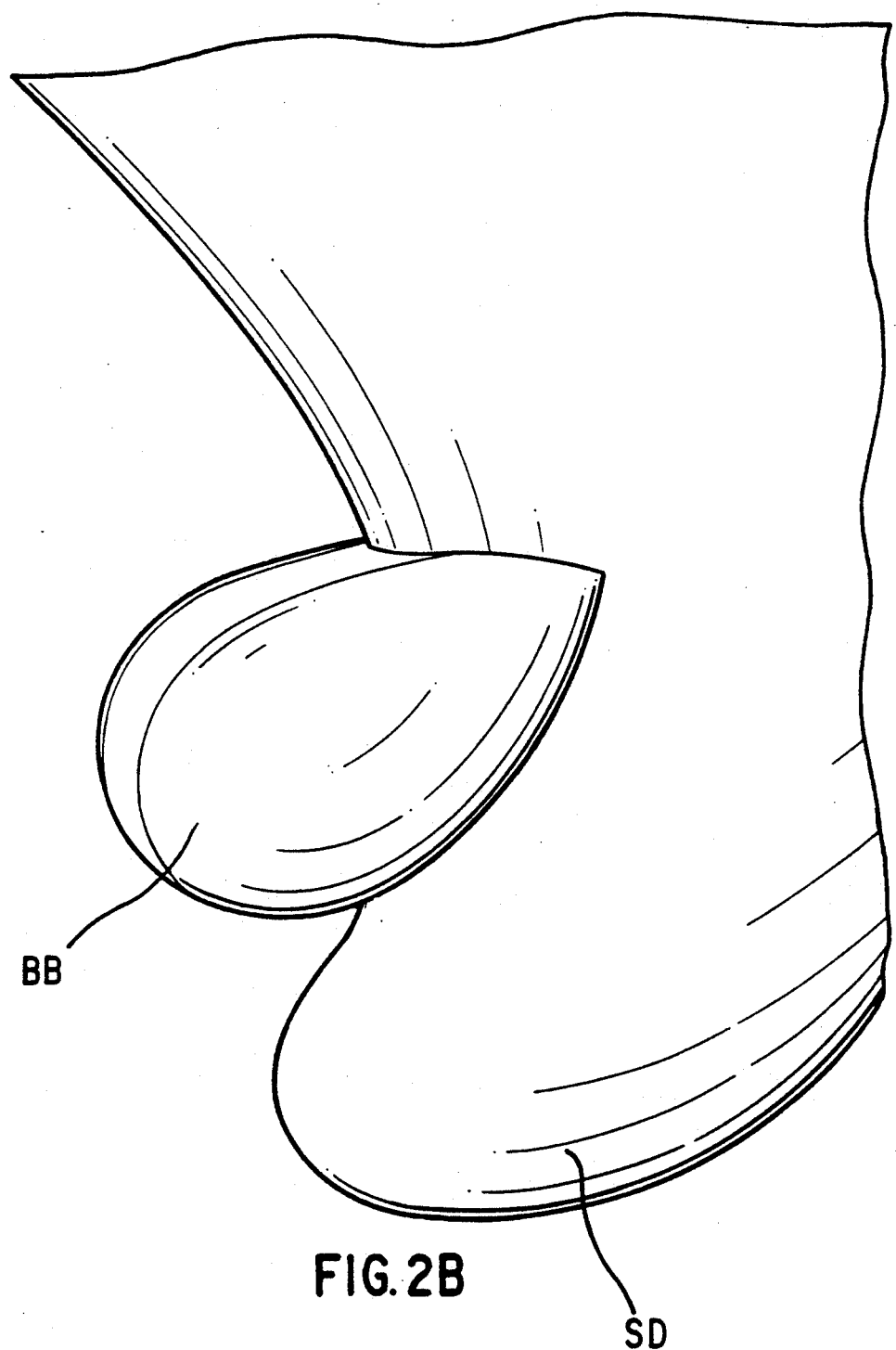
FIG. 2B is a perspective view showing the bulbous bow shown in FIG. 2.

A teardrop shaped bulbous bow was fitted over the existing stem bow of the Model. As shown in FIG. 2, the uppermost point of the bulbous bow is located at a ship scale depth of 1 ft below the design waterline (DWL). As shown in FIGS. 2, 2A, 2B and 3, the bulbous bow and sonar dome are located in a vertical alignment and share a common longitudinal centerline which, in the preferred embodiment, corresponds to the ship longitudinal centerline. Two distinct longitudinal positions in relation to the forward perpendicular (FP) were contemplated. One Model had a bulbous bow having a rounded forward end positioned at the FP and another Model at 12.7 ft ship scale position ahead of the FP. The specific bow design contemplated for the purposes of disclosure of the present invention was selected with a teardrop or oval shape, having the center of area in the middle of it's cross-section. More specifically, the bulbous bow is a smooth, tapered body of revolution consisting of a semi-circular nose of 5.4 ft ship scale radius, smoothly tapered to an aft point as illustrated in FIGS. 2, 2A and 2B, the total ship scale longitudinal length (L) of the bulbous bow being 26 ft. The bulbous bow geometry by location is summarized in Table 1 and shown in FIGS. 2 and 2A. In Table 1, TIP VOLUME refers to volume of the bulbous bow forward of the FP and WET SURFACE refers to the wetted surface area added to the vessel wetted surface area by the addition of the bulbous bow. During resistance experiments, there was no extensive fairing of the bulbous bow into the hull. A small fillet was used to provide for a smooth transition between the surface of the bulbous bow and the hull. The placement of the bulbous bow on the hull in his fashion required substantial hollowness in the aft of the bulbous bow to attach to the stem bow.

TABLE 1

BULBOUS BOW GEOMETRY

| | BULBOUS BOW Locations (Ship Scale) | |
|---|---|---|
| | At FP | 12.7 Fwd of FP |
| LENGTH (L) (ft) | 26.0 | 26.0 |
| HEIGHT (H) (ft) | 10.8 | 10.8 |
| BREADTH (Beam) (ft) | 10.8 | 10.8 |
| DEPTH (Fwd Point) (Ft) | 14.4 | 14.4 |
| WET SURFACE (ft$^2$) | 230 | 632 |
| VOLUME (ft$^3$) | 1391 | 1391 |
| TIP VOLUME (ft$^3$) | 0 | 814 |

FIG. 2A shows a side profile of the bulbous bow mounted to the stem bow such that the forward end is located at the FP. FIG. 2B shows a perspective view of the FIG. 2, which has the bulbous bow mounted such that the forward end is located at 12.7 ft forward of the FP.

For the purposes of the resistance testing, a turbulent flow simulation was conducted to induce turbulent flow over the length of the Model hull by placing one-eight inch diameter by one-tenth inch height turbulence stimulator studs (not shown) at aft of the stem at approximately 10 percent of the waterline length and at the maximum beam of the sonar dome, spaced 1 inch apart. Turbulence stimulation studs were not placed on the bulbous bow.

A "baseline" hullform is represented by the configuration of DTMB Model 5422 which represents the Naval destroyer DDG-51 Flight I with an AN/SQS-53C sonar dome (without the bulbous bow). The baseline resistance data of the DTMB Model 5422, was obtained by ballasting to an even keel displacement corresponding to a full scale 8725 tons with a ship wetted surface of 34,420 ft$^2$. To obtain resistance data of both configurations of the present bulbous bow (one embodiment with the forward end of the bulbous bow at FP and another embodiment at 12.7 ft forward of FP), the Model was ballasted to a displacement corresponding to a full scale 8765 tons. The difference of 40 tons in displacement between the configurations with and without the bulbous bow is due to the displaced volume of the bulbous bow itself. The reported wetted surface for the Model with the bow at the FP was 34,650 ft$^2$ and at 12.7 ft forward of the FP was 35,052 ft$^2$. The two wetted surfaces reported for the bulbous bow configurations were due to the differences in the surface areas masked by the bow in the two different locations.

Data measurements were made using DTMB standard instrumentation which is commercially available. Resistance was measured with a 100 lb capacity DTMB block gauge. The tow force was applied to the Model with a tow post mounted at station 3. The Model was restrained in surge sway, and yaw, but was free to pitch, heave and roll. The Model was tested at speeds corresponding to a full scale speed range of 10 to 32 knots of the Naval destroyer.

The repeatability normally expected for model tests of this nature, above a model Reynold's number of $1.0 \times 10^7$, is $\pm 1.5$ percent for effective power predictions. For the Model, the Reynold's number is $1.0 \times 10^7$ at the Model speed of 2.9 ft/sec which corresponds to a ship scale of approximately 13 knots. However, the Model experiments were conducted consecutively back-to-back and therefore the accuracy placed on the comparisons between configurations should be significantly better than the stated $\pm 1.5$ percent.

Figure 4:
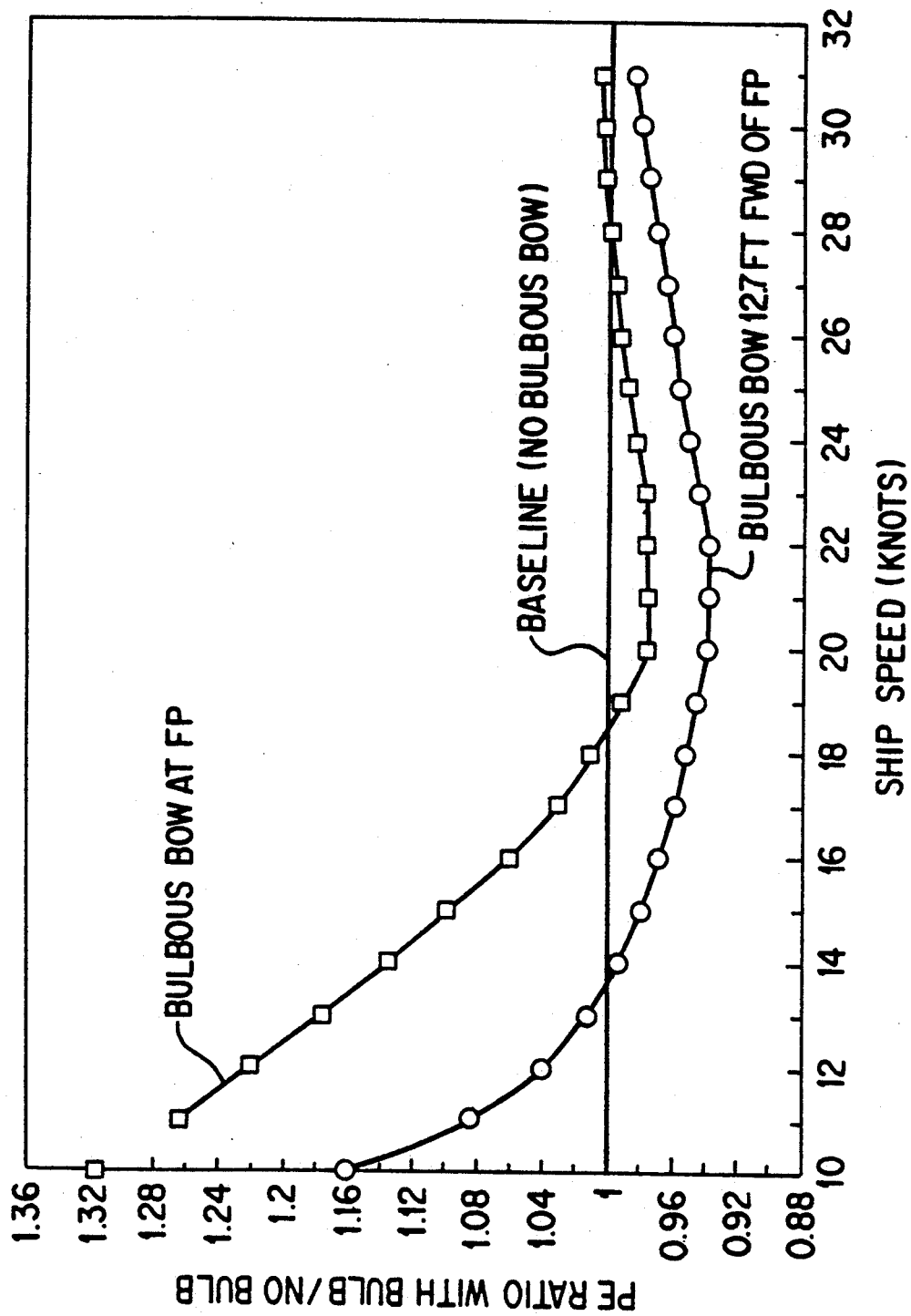
FIG. 4 is a graph of effective power ratios of the Naval destroyer with a twenty-six foot longitudinal length bulbous bow at two distinct locations versus the baseline hullform of the Naval destroyer without the bulbous bow.

As stated previously, the primary object of adding the present bulbous bow is to increase the cavitation inception speed of the ship. In order to achieve that object, a decrease in total ship resistance in the range of the cavitation inception speed is necessary. This can be achieved by the addition of the bulbous bow to the Naval destroyer at both longitudinal locations, at the FP and at 12.7 ft forward of the FP. Table 2 below and FIG. 4 present the estimated effective power reduction potential (PE) of the bulbous bow at the two longitudinal locations for the entire speed range. The resistance ratios are presented for the speed range of 10 to 31 knots. The resistance predictions for all hullforms are presented only as comparative ratios across the speed range.

TABLE 2

POWER (PE) RATIO COMPARISON OF BULBOUS BOW HULLFORMS VS. BASELINE HULLFORM

| SHIP SPEED (Knots) | PE RATIO BULB @ FP/BASE | PE RATIO BULB 12.7 ft Fwd of FP/BASE | PERCENT BULBOUS BOW @ FP/BASE | PERCENT BULBOUS BOW @ 12.7 ft Fwd of FP/BASE |
|---|---|---|---|---|
| 10 | 1.317 | 1.162 | +31.65% | +16.15% |
| 11 | 1.265 | 1.085 | +26.49% | +8.46% |
| 12 | 1.221 | 1.041 | +22.05% | +4.12% |
| 13 | 1.176 | 1.013 | +17.62% | +1.32% |
| 14 | 1.136 | 0.994 | +13.57% | −0.56% |
| 15 | 1.099 | 0.980 | +9.86% | −2.05% |
| 16 | 1.061 | 0.969 | +6.05% | −3.09% |
| 17 | 1.031 | 0.959 | +3.08% | −4.13% |
| 18 | 1.011 | 0.952 | +1.07% | −4.75% |
| 19 | 0.992 | 0.946 | −0.76% | −5.39% |
| 20 | 0.976 | 0.939 | −2.37% | −6.05% |
| 21 | 0.976 | 0.938 | −2.41% | −6.21% |
| 22 | 0.977 | 0.938 | −2.34% | −6.21% |
| 23 | 0.978 | 0.944 | −2.20% | −5.57% |
| 24 | 0.984 | 0.951 | −1.58% | −4.89% |
| 25 | 0.989 | 0.957 | −1.05% | −4.35% |
| 26 | 0.993 | 0.961 | −0.66% | −3.86% |
| 27 | 0.996 | 0.965 | −0.40% | −3.51% |
| 28 | 1.000 | 0.971 | −0.01% | −2.89% |
| 29 | 1.003 | 0.976 | +0.26% | −2.39% |
| 30 | 1.004 | 0.981 | +0.43% | −1.86% |
| 31 | 1.006 | 0.986 | +0.65% | −1.41% |

As shown by the test data shown in Table 2, the present bulbous bow showed the greatest potential for resistance reduction when located at 12.7 ft ahead of FP.

At this location, the present bulbous bow has been predicted to decrease the total ship resistance at all speeds of 14 knots and above (as shown by the PE ratio less than 1.000 in Table 2). The present bulbous bow also performed well when located at the FP, having a predicted reduction in ship resistance between speeds of 19 and 28 knots (as shown by the PE ratio less than 1.000 in Table 2).

To determine the effect of the present bulbous bulb on energy consumption, the annual time-averaged effective power was estimated for each. The annual time-averaged effective power is obtained by summing the total effective power expanded at all ship speeds during a one-year operation. The annual time-averaged effective power is the average effective power for a ship operating for one year with hypothetical speed-time and displacement-time profiles. It is defined as follows:

$$P_E = \sum_{j=1}^{N} \sum_{i=1}^{M} q_{ij} P_{ij}$$

where:
$PE_A$ = Annual effective power usage (same units as effective power)
$P_{ij}$ = Proportion of time spent at speed $V_i$ and displacement condition j
$p_{ij}$ = Effective power at speed $V_i$ and displacement condition j It has been estimated that a comparison of the annual time-averaged effective power between different hullforms is a reasonable representation of the differences in each of the hullforms's annual fuel consumption.

The time spent operating at a specific ship speed is based on the actual DDG-51's estimated annual speed/time profile. The present DDG-51 estimated speed-time profile, used in the calculations of annual time-averaged effective power, is an average of the war-time and peace-time profiles and does not have a displacement variation. The DDG-51 estimated speed-time profile remains confidential with the Navy and therefore cannot be disclosed herein. However, it is to be noted that this confidential speed-time profile is not needed for the understanding or carrying out the teachings of the present invention. The confidential speed-time profile is merely one of infinite number of variables used for calculating the predicted annual time-average effective power as an example.

The present bulbous bow showed the greatest potential for reduction of the annual time-averaged effective power when located 12.7 ft ahead of the FP. At this location, the bulbous bow has been predicted to decrease the annual time-averaged effective power by 4.2 percent. However, the bulbous bow increased the annual time-averaged effective power by 0.66 percent when located at the FP due to its high effective power requirements at low speeds. A summary of the annual time-averaged effective powers of all three embodiments of the DDG-51 is presented in Table 3 below.

TABLE 3

DDG-51 TIME AVERAGED PE COMPARISON
BASED ON PROJECTED SPEED-TIME PROFILE

| Speed Range (Knots) | Time-Average PE BASELINE | Time-Average PE BULBOUS BOW at FP | Time-Average PE BULBOUS BOW at 12.7 ft Fwd of FP |
|---|---|---|---|
| 0-10 | 85.68 | 112.80 | 99.52 |
| 10-12 | 110.10 | 138.55 | 119.42 |
| 12-14 | 269.83 | 315.92 | 273.24 |
| 14-16 | 417.89 | 456.83 | 409.24 |
| 16-18 | 643.62 | 663.55 | 617.28 |
| 18-20 | 1084.82 | 1075.14 | 1025.42 |

TABLE 3-continued

DDG-51 TIME AVERAGED PE COMPARISON
BASED ON PROJECTED SPEED-TIME PROFILE

| Speed Range (Knots) | Time-Average PE BASELINE | Time-Average PE BULBOUS BOW at FP | Time-Average PE BULBOUS BOW at 12.7 ft Fwd of FP |
|---|---|---|---|
| 20-22 | 1539.59 | 1503.05 | 1444.64 |
| 22-24 | 1928.63 | 1889.92 | 1822.58 |
| 24-26 | 1430.19 | 1415.10 | 1368.43 |
| 26-28 | 924.16 | 921.21 | 893.10 |
| 28-30 | 411.45 | 412.48 | 401.91 |
| TOTAL | 8845.94 | 8904.53 +0.66% | 8474.77 −4.20% |

Table 4 below summarizes the results of the tests shown in Tables 2 and 3 above at 20 and 30 knots and the time-averaged effective power.

TABLE 4

PREDICTED PE FOR THE BULBOUS BOW HULLFORMS

| Bulbous Bow Locations | PE Ratio (%) @ 20 Knots | PE Ratio (%) @ 30 Knots | Time-Average PE |
|---|---|---|---|
| At FP | 0.976 (−2.37%) | 1.004 (+0.43%) | +0.66% |
| 12.7 ft Fwd of FP | 0.939 (−6.05%) | 0.981 (−1.86%) | −4.20% |

Figure 5:
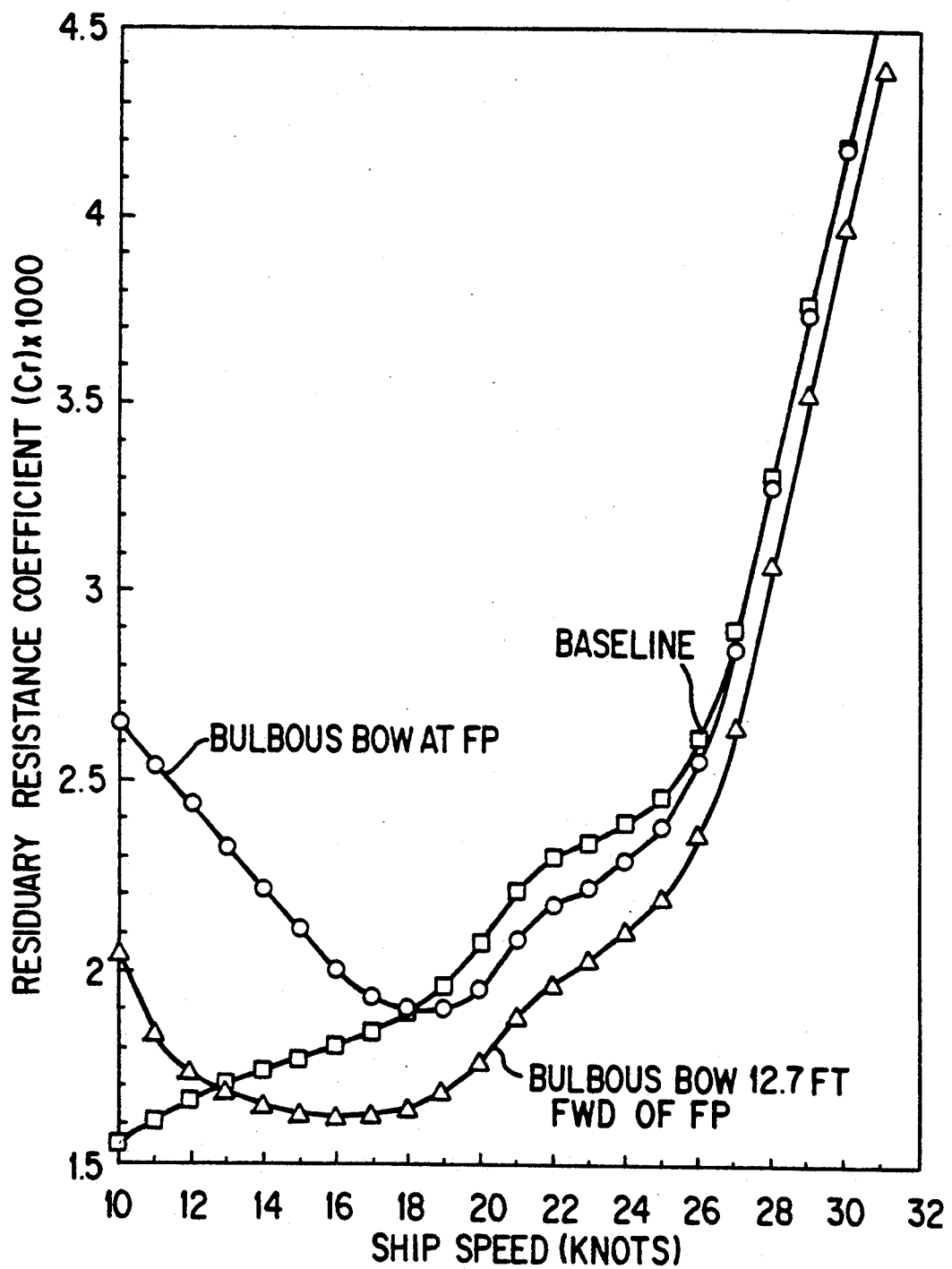
FIG. 5 is a graph of residuary resistance coefficient of the Naval destroyer with a twenty-six foot longitudinal length bulbous bow at two distinct locations versus the baseline hullform of the Naval destroyer without the bulbous bow.

A comparison of the residuary resistance coefficient ($C_R$) for the baseline hullform and the present bulbous bow at both locations is presented in FIG. 5. Note that the ship wetted surface used in the calculation for $C_R$ differs for each hullform. As previously discussed, the ship wetted surface for the baseline hull form was 34,420 ft$^2$, for the Model with the bulbous bow at the FP was 34,650 ft$^2$, and at 12.7 ft forward of the FP was 35,052 ft$^2$.

Figure 6:
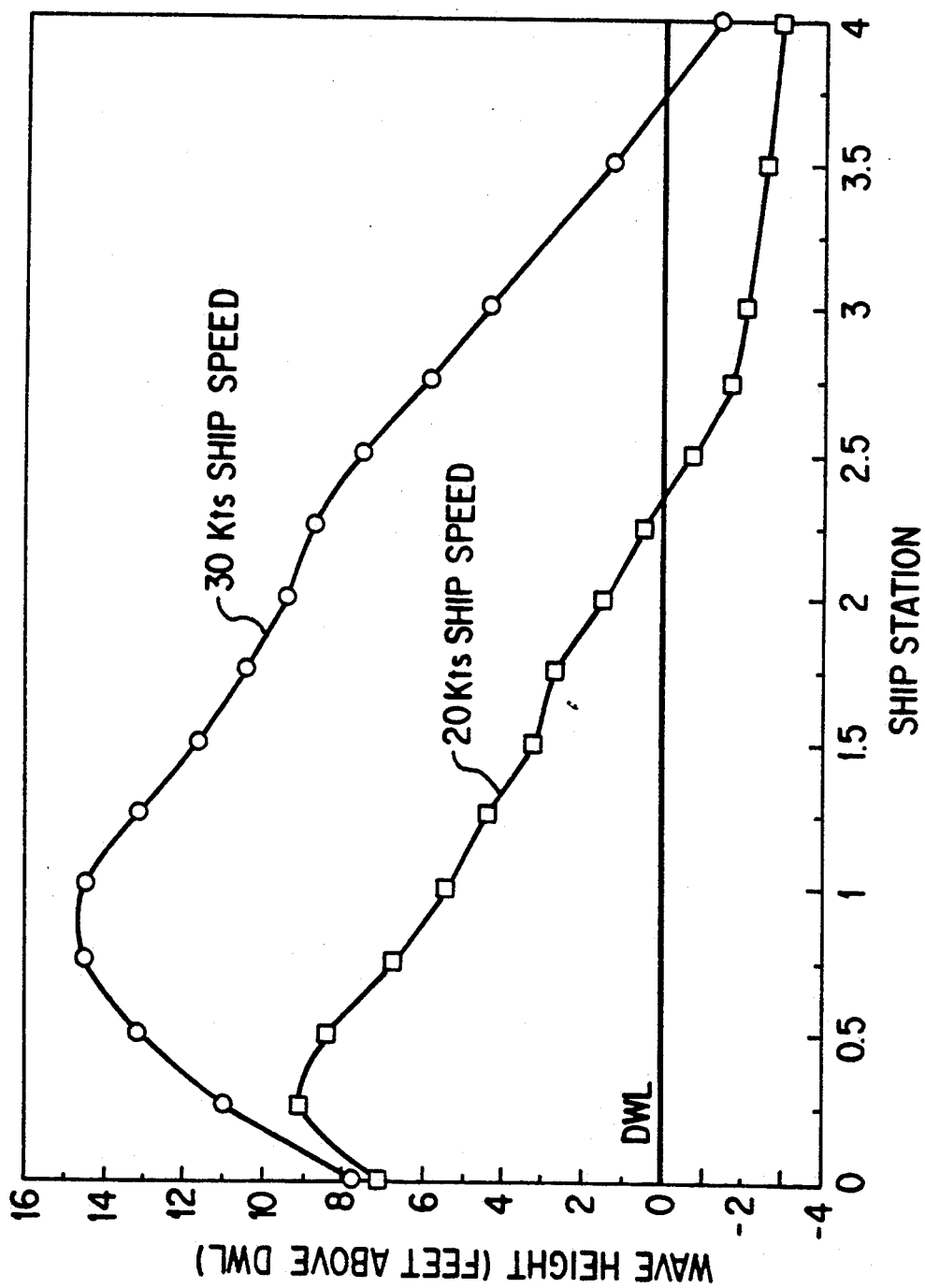
FIG. 6 is a graph of bow wave profiles of the Naval destroyer with a twenty-six foot longitudinal length bulbous bow located at 12.7 feet forward of the forward perpendicular.

FIG. 6 shows a plot of bulbous bow wave profile of the Model with the bulbous bow located 12.7 ft forward of the FP. The wave profiles are presented for ship speeds of 20 and 30 knots. The comparison between the wave profiles for ship speeds of 20 and 30 knots reveals that the difference is insignificant at station 0 or at the forward perpendicular, but shows the most significant difference around station 1.

While the discussion of the present embodiment is primarily drawn to the teardrop shaped bulbous bow, the present invention is not to be limited only to the embodiment expressly shown and disclosed herein. The gist of the present invention is rather a combination of a bulbous bow located between the DWL and the baseline and a sonar dome located below the baseline. The embodiment expressly shown and described herein is merely a preferred embodiment. Given the description of the present invention, it is well within the purview of the present invention to use any other feasible conventional bulbous bow in conjunction with a sonar dome or the like, which would lower the overall ship resistance.

We claim:

1. A bulbous bow for use with a surface ship having a bow mounted sonar dome located at a ship stem bow, below a ship baseline and extending forward of a ship forward perpendicular, said bulbous bow and sonar dome located in a vertical alignment and having a common centerline, to improve efficiency thereof, comprising:

a body of revolution consisting of a rounded nose smoothly tapered to an aft point, wherein said body of revolution is symmetrically attached to said ship stem bow between a ship waterline and said ship baseline, and said body of revolution extends in the longitudinal direction from an aft point aft of said ship forward perpendicular to a forward point at or forward of said ship forward perpendicular.

2. A bulbous bow according to claim 1, wherein said forward point of said body of revolution is about 12.7 ft forward of said forward perpendicular of the ship.

3. A bulbous bow according to claim 1, wherein said body of revolution is attached to said ship stem bow such that an uppermost point of said body of revolution is located about 1 ft below said ship waterline.

4. A bulbous bow according to claim 2, wherein said body of revolution is attached to said ship stem bow such that an uppermost point of said body of revolution is located about 1 ft below said vessel waterline.

5. A bulbous bow according to claim 4 wherein said body of revolution is a smooth, tapered body of revolution consisting of a semi-circular nose of 5.4 ft radius, smoothly tapered to an aft point, the total length of said bulbous bow being 26 ft.

6. In a surface ship having a sonar dome located substantially at a forward section of the ship and extending forward of a ship forward perpendicular and below a ship baseline, an improvement comprising:

a bulbous bow consisting of a rounded nose smoothly tapered to an aft point and attached to a ship stem bow at between a ship waterline and said ship baseline, and having a forward end located at or forward of said ship forward perpendicular, said bulbous bow and sonar dome located in a vertical alignment and having a common centerline, wherein said bulbous bow reduces resistance through water.

7. An improved ship according to claim 6, wherein said forward end of said bulbous bow is about 12.7 ft forward of said forward perpendicular of said ship.

8. An improved ship according to claim 6, wherein said bulbous bow is attached such that an uppermost point of said bulbous bow is about 1 ft below said ship waterline.

9. An improved ship according to claim 7, wherein said bulbous bow is attached such that an uppermost point of said bulbous bow is about 1 ft below said ship waterline.

10. An improved ship according to claim 9, wherein said bulbous bow is a smooth, tapered body of revolution consisting of a semi-circular nose of 5.4 ft radius, smoothly tapered to an aft point, the total length of said bulbous bow being 26 ft.

11. A surface vessel of improved performance capability comprising:

a sonar dome located forward of a vessel forward perpendicular and below a vessel baseline; and a discrete bulbous bow consisting of a rounded nose smoothly tapered to an aft point, said bulbous bow being symmetrically attached to a vessel stem bow between a vessel waterline and said vessel baseline, and said rounded nose being located at or forward of said vessel forward perpendicular, said bulbous bow and sonar dome located in a vertical alignment and having a common centerline, and wherein said bulbous bow is separate and spaced apart from said sonar dome.

12. A vessel according to claim 11, wherein said rounded nose of said bulbous bow extends forward to a point about 12.7 ft forward of said forward perpendicular.

13. A vessel according to claim 11, wherein said bulbous bow is attached such that an uppermost point of said bulbous bow is about 1 ft below said vessel waterline.

14. A vessel according to claim 12, wherein said bulbous bow is attached such that an uppermost point of said bulbous bow is about 1 ft below said vessel waterline.

15. A vessel according to claim 11, wherein said bulbous bow is a smooth, tapered body of revolution consisting of a semi-circular nose of 5.4 ft radius, smoothly tapered to an aft point, the total length of said bulbous bow being 26 ft.

16. A method of reducing hydrodynamic resistance and thus improving propeller efficiency and cavitation performance of a vessel having an appendage located below a vessel baseline and extending forward of a vessel forward perpendicular, comprising the step of:

symmetrically attaching a bulbous bow to a forward section of said vessel between a vessel waterline and said vessel baseline in a spaced relationship with said appendage, said bulbous bow comprising a smooth, tapered body of revolution having a rounded forward end located at or forward of said vessel forward perpendicular and a tapered aft end located aft of said forward perpendicular, said bulbous bow and appendage located in a vertical alignment and having a common centerline.

17. A method according to claim 16, wherein said appendage is a sonar dome which houses a sonar equipment.

* * * * *